Sept. 19, 1939.　　　C. H. HARTMAN ET AL　　　2,173,479
CEMENT PACKER
Filed Sept. 30, 1937　　　2 Sheets-Sheet 1

Inventors
CARL H. HARTMAN, NEILL E. DORRINGTON,
H. STANLEY HANGEN,

By Owen & Owen,
Attorneys

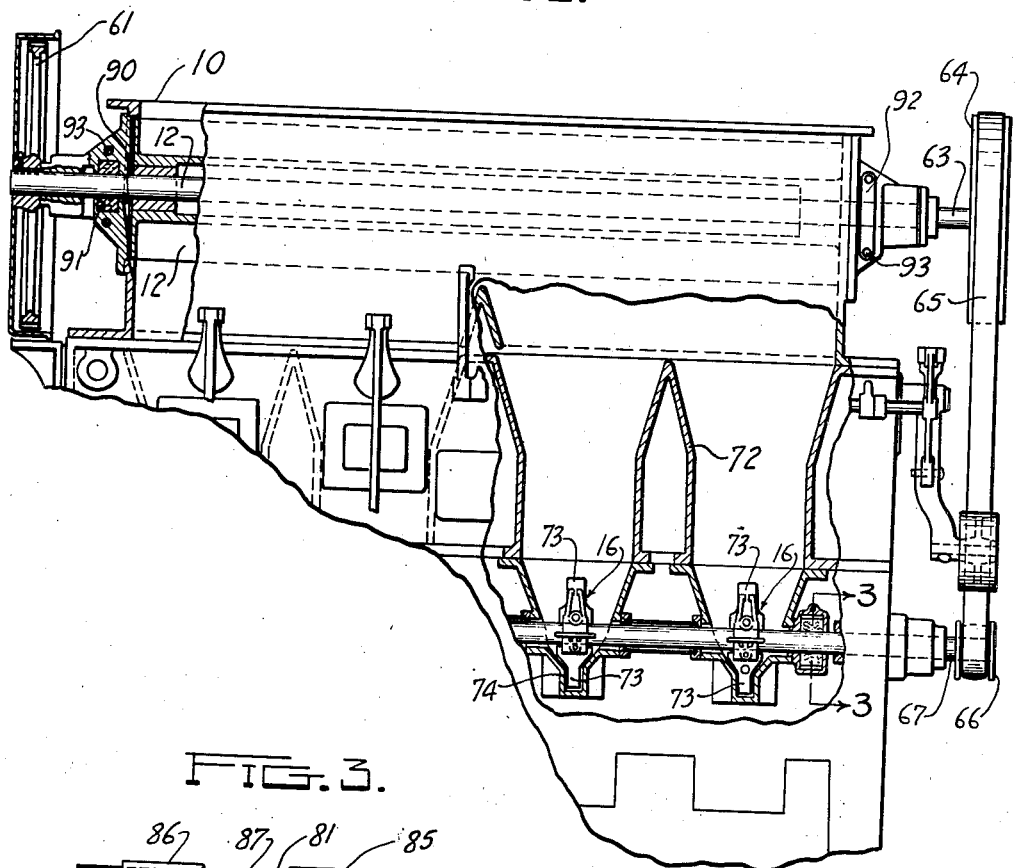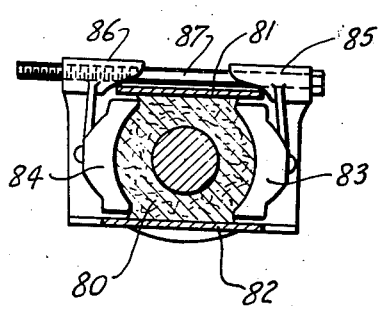

Patented Sept. 19, 1939

2,173,479

UNITED STATES PATENT OFFICE 2,173,479

CEMENT PACKER

Carl H. Hartman, New Rochelle, Neill E. Dorrington, Oswego, and Harry Stanley Hangen, North Tarrytown, N. Y., assignors to St. Regis Paper Company, New York, N. Y., a corporation of New York Application September 30, 1937, Serial No. 166,694

5 Claims. (Cl. 226—48)

This invention relates to an improved packer for packing cement or the like in valve bags. It has for its object an arrangement by which an improved operation of the packer can be secured.

Difficulties which have been encountered in packing cement, particularly of the quick setting, fine ground type, include the entrapping of large amounts of air in the material as it is discharged into the bag so that the bag is filled with air mixed with cement. Prior designs intended to overcome this defect and reduce the air content of the cement have encountered the difficulty of high resistance to the feeder when the discharge gate is closed. By the improvements which constitute this invention, apparatus has been devised which will reduce the air content of the cement and at the same time reduce the horsepower necessary to operate the feeding device.

Another difficulty which has been encountered is that of varying weights in the filled bags. It is customary in such devices to support the bag being filled upon a weighing device and cut off the discharge of the material when the weight of the filled bag reaches a predetermined amount. In factory operation, it is necessary to fill the bags quite quickly and in practice a 95 pound bag of cement is filled within a few seconds. The discharge of material is at such a rapid rate that an appreciable weight of material is discharged between the time when the predetermined weight to operate the weighing apparatus is received in the bag and the time when the discharge valve can be cut off even by the most promptly acting devices which have been constructed. For this reason, the weighing apparatus must be set to be tripped by a weight which is appreciably less than the final weight desired in the bag. It will be readily seen that where this is done, the accuracy of the final weight will depend upon the accuracy with which there is determined the amount of discharge which takes place between the time when the weighing apparatus starts to act and the time when the discharge is completely cut off. This can be determined with fair accuracy only when the discharge of material is fairly constant. Anything which causes the discharge to be irregular interferes with the accurate determination of this final amount of filling and, therefore, interferes with accuracy of weights.

One of the improvements accomplished by this invention is an increased regularity in the discharged stream which increases the accuracy of the final weights.

Other improvements relating to the accuracy of weights and the proper filling of the material into the bag will appear as the description proceeds.

In the accompanying drawings forming a part of this specification,

Fig. 2 is a partial section of the feeding portion of the device taken transversely of Fig. 1; and Fig. 3 is a detail section on line 3—3 of Fig. 2 showing a packing for the driving shaft.

Figure 1:
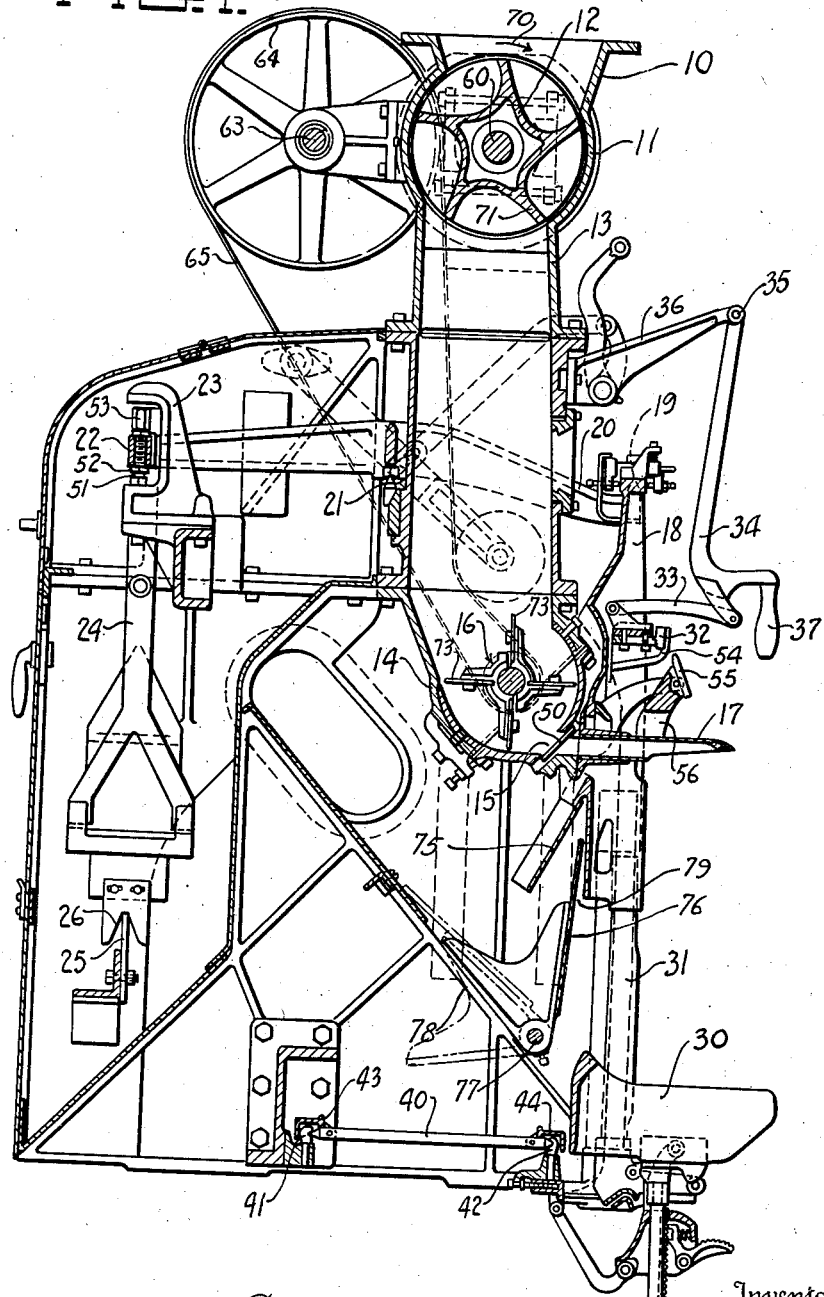
Figure 1 is a vertical section of one form of apparatus embodying the invention.

The form of apparatus disclosed comprises a receiving hopper 10 which may be attached to a suitable bin which supplies the material to be packaged. Hopper 10 guides the material from the bin to a housing 11 having cylindrical walls on the sides enclosing a feeding spider 12. The feeding spider 12 discharges the material into a chute 13 which directs the material into a feeder housing 14 from which it is discharged through an opening 15 by the feeder 16. A feeding spout 17 is arranged in position to receive the material discharged from opening 15 and guided into a valve bag. The spout is supported upon a frame 18 pivoted at 19 upon weighing beams 20 which extend on opposite sides of the feeding hopper 13, only one of these beams being shown in Fig. 1. The beam is fulcrumed at 21 and the swinging of the rear end 22 of the beam is limited by a fixed bracket 23. A weight 24 is hung from the rear end of the beam to counterbalance the weight of the bag. A bracket 25 is fixed on the frame of the apparatus and is adapted to enter a notch 26 in the lower end of the weight-carrying member 24 and limit the swinging movement of the weight carrier.

A bottom support 30 for the bag is mounted in a suitable way on the lower end of frame 18. The bottom support 30 is arranged at the lower end of a swinging frame 31, the upper end 32 of which is connected by a link 33 with the bottom end of a link 34 pivoted at 35 upon a bracket 36 extending outward from the frame of the apparatus. At the lower end of link 34, there is provided a handle 37 for purposes which will be detailed later. The lower end of frame 18 is prevented from swinging movement by a link 40 which abuts at one end against a member 41 upon the frame of the machine, and at the other end against a member 42 mounted on the lower end of frame 18. Retainers 43 and 44 are pivoted at the respective ends of link 40 and cover the pivotal contacts between the link and members 41 and 42, respectively, and also prevent undue separation of members 41 and 42. It will be seen that members 43 and 44 perform the double function of maintaining the link in proper pivotal relation with the members 41 and 42, and at the same time cover these pivotal connections so as to avoid the entrance of any dust which might otherwise interfere with the relative movement of the parts. It will be seen that bottom support 30 and side members 31 of the connected frame are pivotally connected to the bottom of frame 18 and the connection is so arranged that the bottom is adjustable and its tilting movement is controlled as desired, but the details of these connections form no part of the present invention and need not be described in this application.

The apparatus is provided with a gate 50 which closes the discharge opening 15 when the bag is filled and until it is desired to fill another bag. The opening of the valve is controlled by a handle, not shown. It will be readily understood that the gate is opened by this handle and the closing thereof is controlled by trip mechanism operated by the movement of the scale beam, and frame 18 supported thereby. This arrangement is old in the art and the details may be constructed in accordance with any of the known or desirable devices, and for purposes of simplification are largely omitted from the drawings. However, it may be pointed out that the trip arrangement is designed to operate upon a relatively slight movement of the weighing beam so as to reduce as far as possible the time interval between the filling of the bag to the extent that will start movement of the scale beam and the closing of the gate 50.

In order to eliminate unnecessary movement of the scale beam after the trip has been operated, a screw 51 is provided in the rear end 22 of the scale beam, this screw being held in adjusted position by a lock nut 52 and entering an elongated nut 53 above the beam. In this way, the height to which the front end of the beam is raised in order to raise a catch and retain gate 50 in open position is adjusted with accuracy, while the extent to which the beam drops is also limited by bracket 23. When the predetermined weight is filled into the bag and the front end of the beam drops sufficiently to release the catch, gate 50 is closed, permitting frame 32 to be pulled forward by handle 37. In so swinging, bracket 54 engages a projection 55 on clamp 56 which is employed to clamp the bag upon spout 17. In this way, the clamp is released by the initial movement of frame 32 and the bag is allowed to tilt with the frame until the top end thereof slips off of spout 17 and the bag is discharged.

The feeding spider 12 is mounted upon a shaft 60 which may be driven by a gear 61, shown on Fig. 2, meshing with a gear, not shown, on a countershaft 63 which in turn carries a pulley 64 connected by belt 65 to a pulley 66 on the end of drive shaft 67. In the construction illustrated in Fig. 2, there are indicated four filling units such as shown in section in Fig. 1, and the spider and drive shaft 67 are common to all of these units, there being a separate feeder 16 mounted upon the drive shaft within each unit.

The spider 60 is rotated in the direction of arrow 70 and the blades 71 are slanted rearwardly so that they have a tendency to press the discharged material downward into the feeding hopper 13. As will be seen from Fig. 1, this feeding hopper expands slightly downward so as to avoid as far as possible any interference with the downward movement of the material. However, between each of the units there is an approximately V-shaped member 72 in the feed hopper so that the material is guided in a continuous stream from a position near the feeding spider to the feeding housing. The surfaces are all arranged to avoid any abrupt change in direction which is likely to interfere with the flow of the material.

Feeder 16 is provided with feed blades 73 which are rectangular, and the housing 14 is provided with rectangular grooves 74 into which the blades 73 fit so as to drive towards the discharge opening all material in the groove.

By the shape of spider blades 71, the material is pressed down slightly in the feed hopper, and the complete filling of the hopper without any vacant spaces is thus insured. Also, the successive spider blades passing over the material in the top of the feed hopper has a trowelling effect which tends to reduce the amount of air trapped in the material. This trowelling effect is aided by making the spider larger in diameter than the centrifugal propeller, and the discharge from the spider as wide as the receiving opening to the propeller. This arrangement together with the shaping of the discharge groove and feeder blades results in a relatively constant supply and discharge of the material during the feeding of the bag so that the weight of material which will be discharged in the time intervening between the start of the descent of the filled bag and the closing of the gate may be estimated with fair accuracy. It will be readily understood that any air pockets resulting from irregular dropping of the material into the feed hopper, or from irregular flow of the material from the hopper to the discharge feeder, or from any other reason, will cause fluctuations in the rate of travel which cannot be predetermined and which interfere with the accuracy of weights. In the construction shown, the accuracy of weights is further improved by preventing undue swing of the weight carrier 24, the relatively frictionless guiding of the lower end of carrier 18, and by the guarding against dust reaching the pivot points. The scale beams with their fulcrums and the counterbalancing weight, etc., are enclosed in substantially dust-proof housings which assist in reducing the interference by dust with the accuracy of weights.

This is further facilitated by connecting in any suitable way, not shown, the interior of the frame casing to a source of vacuum so as to carry off such dust as escapes during the filling operation. The dust which escapes from immediately around the filling spout 17 is guided back into the machine housing by a chute 75. Where a paper bag is to be filled, there is substantially no escape of dust through the walls of the bag. Under such circumstances, a shield 76 pivoted in the casing at 77 is arranged in an upstanding position, as indicated in full lines in Fig. 1. This leaves an opening 78 in the bottom of the casing into which air is drawn to form a current which carries to the vacuum discharge any dust falling from chute 75 or otherwise entering the casing during the filling operation.

When a cloth bag is filled, there is escape of dust through the walls of the bag. Therefore, during such a filling operation, it is preferable to swing shield 76 to the position shown in dotted lines in Fig. 1, where it closes opening 78 and provides an opening at 79 adjacent the lower end of the bag and into which air is drawn from around the bag during the filling operation so as to remove dust escaping through the walls of the bag.

A packing arrangement for the driving shaft is shown in Fig. 3 which maintains a dust-proof contact with the shaft without undue pressure at any point. In this arrangement, a packing 80 is confined on the upper and lower side of the shafts by parallel plates 81 and 82, while it is compressed on opposite sides by shoes 83 and 84. Shoes 83 and 84 are contacted by lugs 85 and 86. A bolt 87 passes through an opening in lug 85 and is screw-threaded into lug 86 so that by tightening the bolt, the two shoes 83 and 84 are drawn towards each other. At the same time, they are free to move laterally together in either direction so that their pressure upon the packing must exactly balance at all times. In this way, there is avoided any tendency of compressing the packing more on one side of the shaft than on the other side.

In order to provide against cement working outward into the bearings of shaft 63, there is provided on the under side at the end of the housing a cut-away portion 90, as shown at the left of Fig. 2. It will be readily seen that any cement which works out along the shaft on the upper side thereof beneath the end partition of hopper 10 is carried around by the rotation of the shaft and dropped from the under side at relieved portion 90 and so does not work outward into the bearing. A stuffing box 91 is provided at each end of shaft 63 similar in construction to that disclosed in Fig. 3, in which case the shoes, one of which is indicated at 92 at the right end of Fig. 2, are drawn by bolts 93 on the same principle as bolt 87, shown in Fig. 3.

The operation of the apparatus will be fairly clear from the above description, and has been detailed to some extent in connection with the description, but will be summarized for convenience.

The operator places the valve of the bag over filling spout 17 and operates the handle to open the gate 50. The spider 12 and feeder 16 are operating continuously. The action of the spider 12 is to lightly press the filling material into the feeding hopper and discharge housing so that they are maintained full of the cement. Also, the slanting blades 71 of the spider have a trowelling effect upon the material as it is being fed to the hopper and eliminate excess air which might otherwise be trapped in the material. When gate 50 is open, the blades 73 fit in grooves 74, and discharge the material in a continuous stream of approximately constant consistency through the gate and spout into the bag. When sufficient material has been fed into the bag to overcome the counterbalancing weight of the weighing device, the front end of scale beams 20 begins to drop. A trip is adjusted so as to allow the closing of gate 50 with a minimum drop of the front end of the scale beam. This reduces to a minimum the amount of material discharged after a weight equal to the counterbalance has been received in the bag, but even so, the interval between this time and the time the gate closes is a sufficient fraction of a second to involve the discharge of several pounds of material. The approximately even stream of material which is discharged during this interval increases the uniformity of the weight finally filled into the bag. At the same time, the arrangement by which the material is lightly pressed downward into the feeder housing and is trowelled at the top reduces the amount of air in the cement and results in a more densely packed bag. For this reason, the bags are filled not only with more uniform amounts of material, but also more densely, so that a smaller bag can be employed for a given weight of cement than would be necessary otherwise.

It will be understood that the minor improvements mentioned in the specification cooperate in insuring prompt and even action of the weighing apparatus and continued and easy operation of the filling apparatus.

What we claim is:

1. A spout adapted to enter the valve of a bag, a centrifugal propeller adapted to drive material into and through the spout, a chute to direct material to the propeller, and means to feed material to the chute, said feeding means comprising a spider with rearwardly directed blades adapted to have a trovelling effect upon the material at the top of the chute.

2. A spout adapted to enter the valve of a bag, a centrifugal propeller adapted to drive material into and through the spout, a chute to direct material to the propeller, and means to feed material to the chute, said feeding means comprising a spider with rearwardly directed blades adapted to have a trowelling effect upon the material at the top of the chute, and the spider having a diameter greater than that of the propeller.

3. A spout adapted to enter the valve of a bag, a centrifugal propeller adapted to drive material into and through the spout, a chute to direct material to the propeller, and means to feed material to the chute, said feeding means comprising a spider with rearwardly directed blades adapted to have a trowelling effect upon the material at the top of the chute, the surface exposed to said trowelling effect being approximately as great as the opening through which the propeller receives material from said chute.

4. A centrifugal packer comprising a receiving hopper, a feeding spider discharging material from said hopper, a discharge housing, a centrifugal propeller in the housing, a spout adapted to enter the valve of a bag and normally in position to receive the material discharged by the propeller, and a chute receiving material from the spider and delivering it to the housing, said spider comprising blades curved at their outer edges rearwardly with respect to the direction of their rotation.

5. A cement packer comprising an elongated receiving hopper, a spider housing at the bottom of the hopper, said housing being cylindrical with its axis horizontal, the spider substantially fitting in said housing, a plurality of chutes directed downward from said cylindrical housing and narrowing in the direction of the length of the housing and broadening downward transversely of said housing, and a centrifugal propeller at the bottom of each chute, the blades of the propeller substantially fitting in the bottom of the chute and the arms of the spider curving rearwardly and trowelling the material at the tops of the chutes.

CARL H. HARTMAN.
NEILL E. DORRINGTON.
H. STANLEY HANGEN.